United States Patent [19]

Chludek

[11] Patent Number: 5,637,050
[45] Date of Patent: Jun. 10, 1997

[54] DIFFERENTIAL DRIVE WITH LOCKING EFFECT

[75] Inventor: Adrian Chludek, St. Augustin, Germany

[73] Assignee: GKN Viscodrive GmbH, Lohmar, Germany

[21] Appl. No.: 597,707

[22] Filed: Feb. 7, 1996

[30] Foreign Application Priority Data

Feb. 22, 1995 [DE] Germany ................ 195 06 068.7

[51] Int. Cl.$^6$ ............ F16H 48/20; F16H 48/10; B60K 23/04
[52] U.S. Cl. ................................................ 475/249
[58] Field of Search ............................ 475/249, 252

[56] References Cited

U.S. PATENT DOCUMENTS

| | | |
|---|---|---|
| 4,012,968 | 3/1977 | Kelbel . |
| 4,058,027 | 11/1977 | Webb . |
| 4,224,838 | 9/1980 | Roushdy et al. . |
| 4,831,890 | 5/1989 | Valentin et al. ............ 475/249 |
| 4,836,051 | 6/1989 | Guimbretiere . |
| 4,905,808 | 3/1990 | Tomita et al. . |
| 4,966,268 | 10/1990 | Asano et al. . |
| 4,982,808 | 1/1991 | Taureg et al. . |
| 5,007,515 | 4/1991 | Shimizu . |
| 5,007,885 | 4/1991 | Yamamoto et al. . |
| 5,012,908 | 5/1991 | Kobayashi et al. . |
| 5,031,743 | 7/1991 | Morishita et al. . |
| 5,036,963 | 8/1991 | Murata . |
| 5,056,640 | 10/1991 | Yamamoto . |
| 5,063,738 | 11/1991 | Asano et al. . |
| 5,070,975 | 12/1991 | Tanaka et al. . |
| 5,080,187 | 1/1992 | Asano et al. . |
| 5,127,503 | 7/1992 | Gratzer . |
| 5,129,870 | 7/1992 | Pierce . |
| 5,178,249 | 1/1993 | Haga et al. . |
| 5,197,583 | 3/1993 | Sakai et al. . |
| 5,259,488 | 11/1993 | Oberdorster et al. . |
| 5,261,862 | 11/1993 | Pierce . |
| 5,267,916 | 12/1993 | Beim et al. . |

FOREIGN PATENT DOCUMENTS

| | | |
|---|---|---|
| 0247008 | 5/1987 | European Pat. Off. . |
| 0347165 | 6/1989 | European Pat. Off. . |
| 480175 | 9/1991 | European Pat. Off. . |
| 0549828 | 12/1991 | European Pat. Off. . |
| 0639730 | 8/1994 | European Pat. Off. . |
| 938813 | 7/1949 | Germany . |
| 4103054 | 8/1991 | Germany . |
| 4032245 | 3/1992 | Germany . |
| 6487928 | 4/1989 | Japan . |
| 1126440 | 5/1989 | Japan . |
| 1220728 | 9/1989 | Japan . |
| 251626 | 2/1990 | Japan . |
| 2120529 | 5/1990 | Japan . |
| 2120530 | 5/1990 | Japan . |
| 337455 | 2/1991 | Japan . |
| 369829 | 3/1991 | Japan . |
| 2202602 | 9/1988 | United Kingdom . |
| 2222232 | 2/1990 | United Kingdom . |

*Primary Examiner*—Dirk Wright
*Attorney, Agent, or Firm*—Dinnin & Dunn, P.C.

[57] ABSTRACT

A differential drive comprising two axle shaft gears supported coaxially in the differential carrier and having different pitch circle diameters, and a plurality of differential gears which are supported relative to said axle shaft gears in an axis-parallel way in the differential carrier and which, by means of their tooth heads, are slidingly supported in axial bores of the differential carrier, with first differential gears covering the axial length of both axle shaft gears and comprising two different toothed regions of which the teeth of a first one engage the teeth of the axle shaft gear with the greater pitch circle diameter and of which the teeth of a second one engage the teeth of at least one of said further differential gears and with second differential gears covering the axial length of the axle shaft gear with the smaller pitch circle diameter and, along said length, engaging both the axle shaft gear and at least one of the first differential gears and with the major diameters of both toothed regions of the first differential gears being identical relative to one another and with the first differential gears being supported in bores extending over the entire length of the differential gears and having constant diameters.

3 Claims, 1 Drawing Sheet

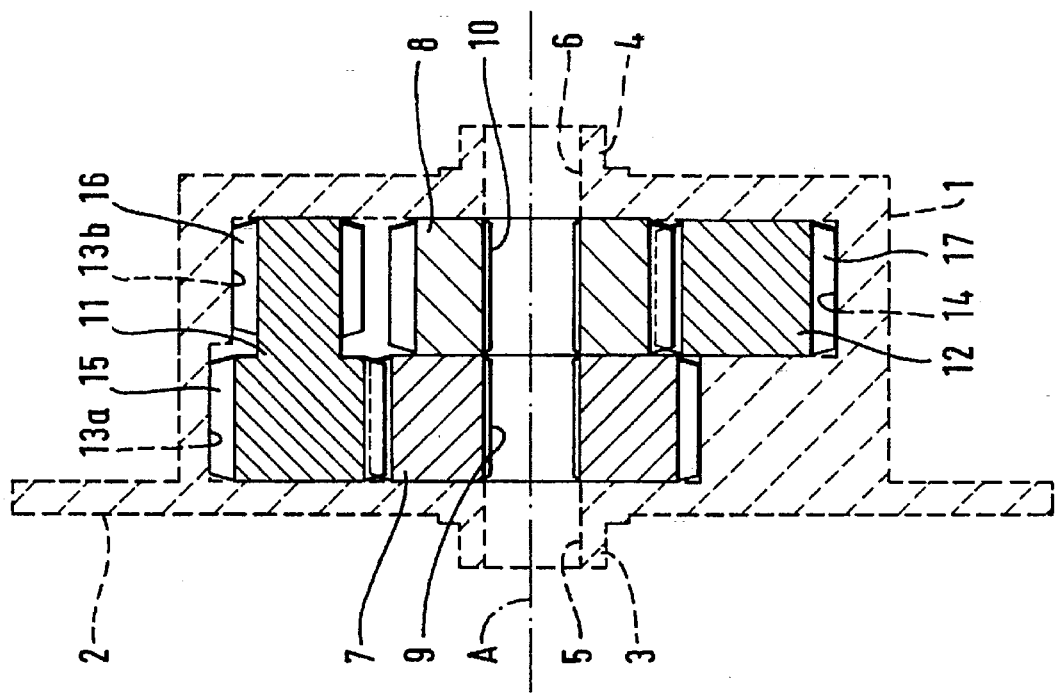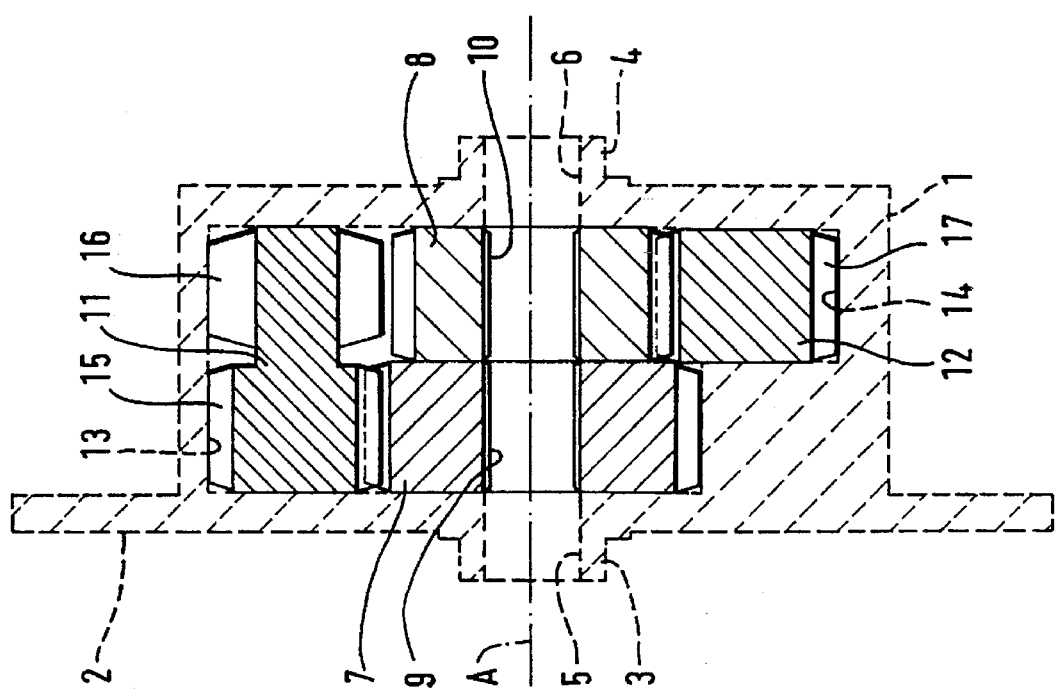

DIFFERENTIAL DRIVE WITH LOCKING EFFECT

BACKGROUND OF THE INVENTION

The invention relates to a differential drive having a differential carrier which is rotatably supported in a drive housing and rotatingly drivable from the outside, having two axle shaft gears which are coaxially supported in the differential carrier, which have to be connected to axle shafts and comprise different pitch circle diameters, and having a plurality of differential gears which are supported in an axis-parallel way relative to said axle shaft gears in the differential carrier and whose teeth engage the teeth of one of the axle shaft gears and at least one of the further differential gears whose teeth engage the teeth of the other one of the axle shaft gears and which, by means of their tooth heads, are slidingly supported in axial bores of the differential carrier, with first differential gears covering the axial length of both axle shaft gears and comprising two different toothed regions with different pitch circle diameters, of which a first one engages the axle shaft gear with the greater pitch circle diameter and of which a second one engages at least one of said further differential gears and with second differential gears covering the axial length of the axle shaft gear with the smaller pitch circle diameter and, along said length, engaging both the axle shaft gear and at least one of the first differential gears.

Differential drives of this type are known from DE 41 26 866 A1. Differential drives of said type are used in motor vehicles in the form of central differentials wherein, as a rule it is desirable to have an uneven torque distribution between the front axle and rear axle. Because of their design, they have a self-inhibiting or partially locking effect which is based on the friction of the tooth heads of the axle shaft gears in their bores. Said locking effect increases as a function of the torque at the differential carrier due to the increase in tooth forces and thus the increase in the respective reaction forces between the differential gears and the axle shaft gears, which reaction forces also determine said friction. The torque distribution between the axle shaft gears may be uneven or even.

The above publication describes a particularly short embodiment which is thus easy and cheap to produce, wherein the axle shaft gears directly axially adjoin one another and wherein the differential gears engage one another in the region of the axle shaft gear with the smaller pitch circle diameter.

It is the object of the invention to simplify even further a differential drive of the type described here. The object is achieved in that the major diameters of both toothed regions of the first differential gears are identical relative to one another and that the first differential gears are supported in bores which extend along the entire length of the differential gears, comprising a constant diameter. In this way, it is possible to simplify considerably the production of the differential carrier of the differential drive in accordance with the invention and especially the operation of machining the bores for the axle shaft gears and differential gears, the latter being the most production-intensive process stage. Because of the stepped bores for the first differential gears with two toothed portions of different major diameters, state of the art differential drives required different tools to be used for the two bore portions, with methods other than those involving drilling or the use of spindles not being suitable. With differential drives according to the invention, production is simplified in that the through-apertures for the first differential gears allow the use of broaching; in any case, it is possible for the entire inner bore to be machined with one single tool during the individual process stages, and the same production method can be used for the apertures of the second differential gears when these are axially supported on the larger axle shaft gear, as is known from the state of the art.

Depending on the size ratios of the effective pitch circles at the axle shaft gears and differential gears, the torque distribution in differentials in accordance with the invention between the axle shaft gears may also be either uneven or even.

A preferred embodiment of the invention will be described below with reference to the drawing wherein.

BRIEF DESCRIPTION OF THE DRAWINGS

FIG. 1 is a longitudinal section through the differential carrier of a differential drive in accordance with the invention.

FIG. 2 is a longitudinal section through the differential carrier according to the state of the art.

DESCRIPTION OF THE PREFERRED EMBODIMENT(S)

The Figures, in dashed lines, show a differential carrier 1 composed of individual parts, especially a central cylindrical portion and two disc-shaped covers, or of a housing portion closed at one end and one single disc-shaped cover. The differential carrier 1, in its contours, is shown to have a flange 2 and journal projections 3 and 4 arranged concentrically relative to the shaft apertures 5, 6. The flange 2 serves to fix a crown wheel which drives the differential carrier 1. The journals 3, 4 serve to attach bearing means which rotatably support the differential carrier 1 inside the drive housing. Inside the differential carrier there are shown two axle shaft gears 7, 8 of different sizes which are arranged so as to directly axially adjoin one another. The axle shaft gears comprise inner toothings 9, 10 into which it is possible to plug-in axle shafts passing through the axle shaft apertures 5, 6. In the embodiment shown, the axle shaft gears do not comprise any special bearing means, but are supported directly on their tooth heads in cylindrical bores extending coaxially relative to the longitudinal axis A; see underneath axle shaft gear 7. The first larger axle shaft gear 7 engages at least one planetary gear or differential gear 11 which comprises two toothed portions 15 and 16. Only the first toothed portion 15 engages the axle shaft gear 7, being of equal length therewith. The toothed portion 16 of the differential gear 11 extends into an axial region occupied by the second axle shaft gear 8. The axle shaft gear 8 engages at least one planetary gear or differential gear 12. To achieve the differential function, each differential gear 12, by means of its uniform toothed region 17, directly engages the toothed region 16 of at least the one differential gear 11. Both the illustrated differential gear 11 and the illustrated differential gear 12 are supported in cylindrical bores 13, 14 which are adapted to their respective diameters and in which they slide directly by means of the tooth heads of their toothed regions.

In accordance with the invention, the cylindrical bore 13 as shown in FIG. 1 has the same diameter throughout, which means that the toothed regions 15 and 16 of the differential gear 11, although they have different pitch circle diameters, comprise identical major diameters. In contrast thereto, the state of the art embodiment as shown in FIG. 2 comprises two stepped cylindrical bore portions 13a, 13b for the toothed portions 15, 16 which also have different pitch circle diameters, but which, because they comprise identical tooth heights, also have clearly different major diameters.

What is claimed is:

1. A differential drive having a differential carrier which is rotatably supported in a drive housing and rotatingly drivable from the outside, said differential drive including:

two axle shaft gears which are coaxially supported in the differential carrier, which are connectable to axle shafts and comprise different pitch circle diameters;

a plurality of differential gears which are supported in an axis-parallel way relative to said axle shaft gears in the differential carrier and whose teeth engage teeth of one of the axle shaft gears and at least one of the further differential gears whose teeth engage the teeth of the other one of the axle shaft gears and which, by means of their tooth heads, are slidingly supported in axial bores of the differential carrier, with first differential gears covering an axial length of both axle shaft gears and comprising two different toothed regions with different pitch circle diameters, of which a first region engages the axle shaft gear with a greater pitch circle diameter and of which a second region engages at least one of said further differential gears and with second differential gears covering an axial length of the axle shaft gear with a smaller pitch circle diameter and, along said length, engaging both the axle shaft gear and at least one of the first differential gears, said both toothed regions of the first differential gears having major diameters identical relative to one another, and said first differential gears being supported in bores comprising a constant diameter and which extend along an entire length of the differential gears.

2. A differential drive according to claim 1 wherein, the differential carrier consists of a dish-like housing part with a cover part, with bores for the differential gears constituting blind holes in the dish-like housing part.

3. A differential drive according to claim 1 wherein, the differential carrier consists of a cylindrical housing part and two cover parts, with bores for the differential gears being through-holes in the cylindrical housing part.

* * * * *